R. A. BERGER.
WRAPPING MACHINE.
APPLICATION FILED JUNE 26, 1905.
1,048,933.
Patented Dec. 31, 1912.
7 SHEETS—SHEET 1.
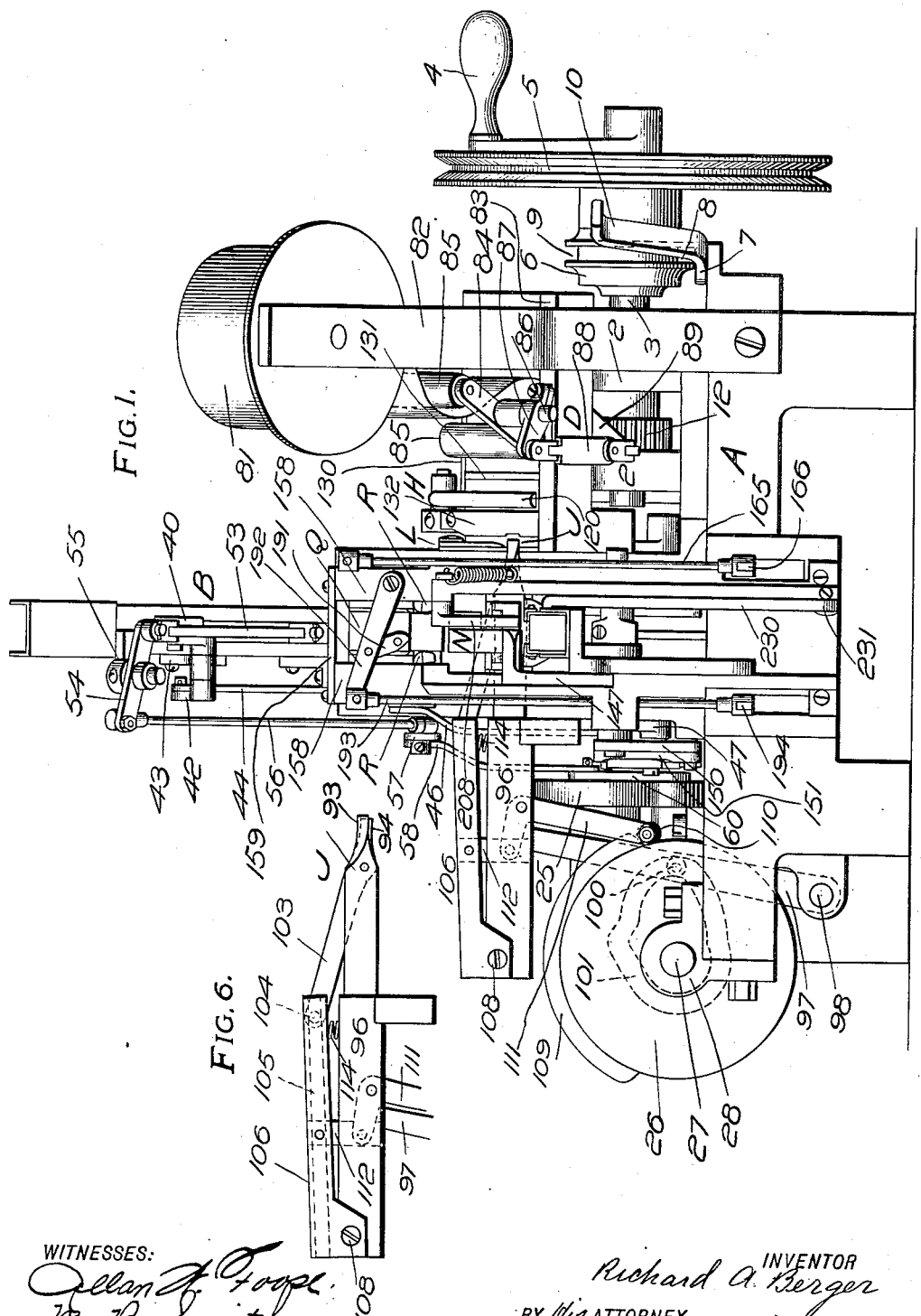

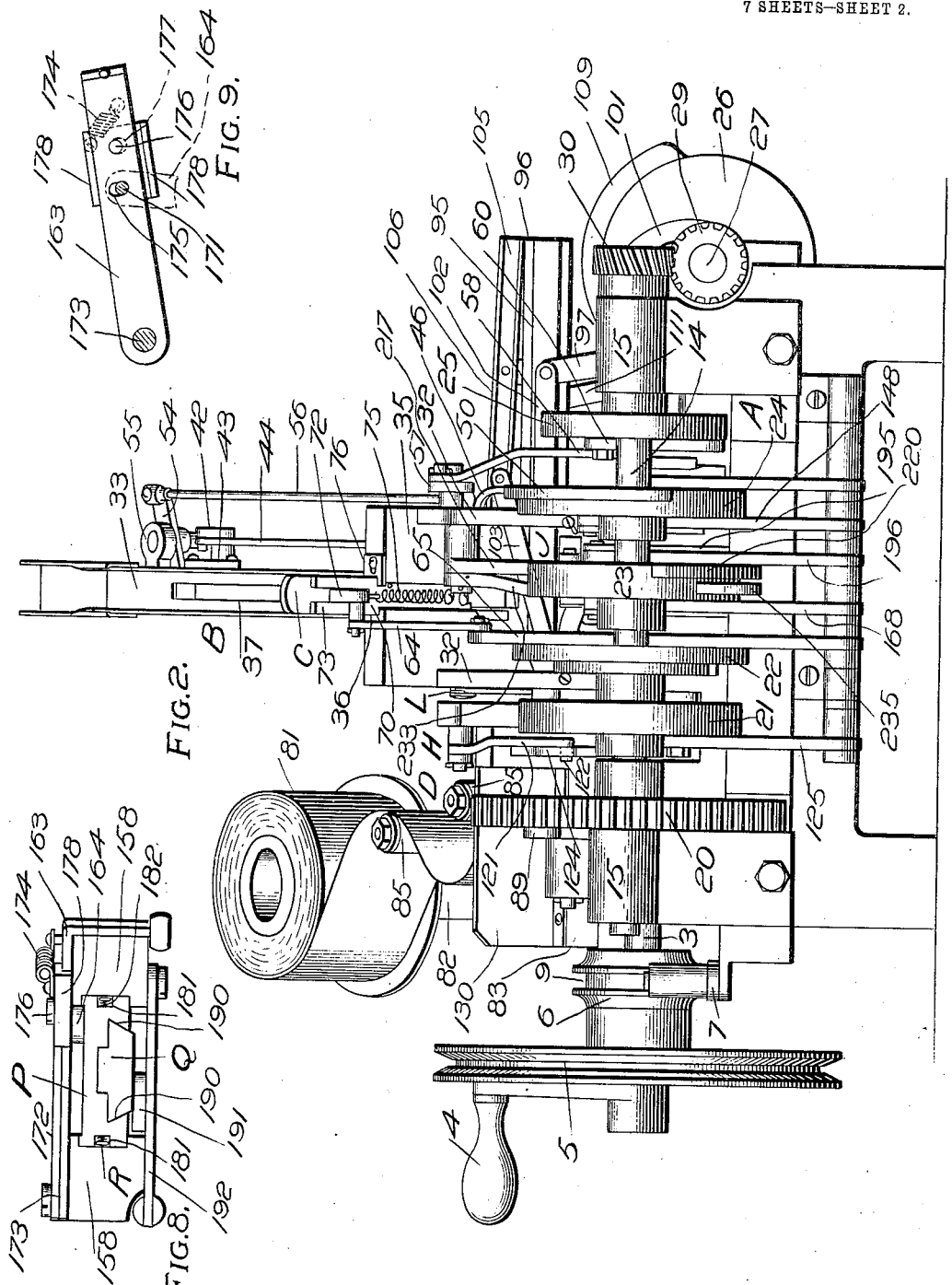

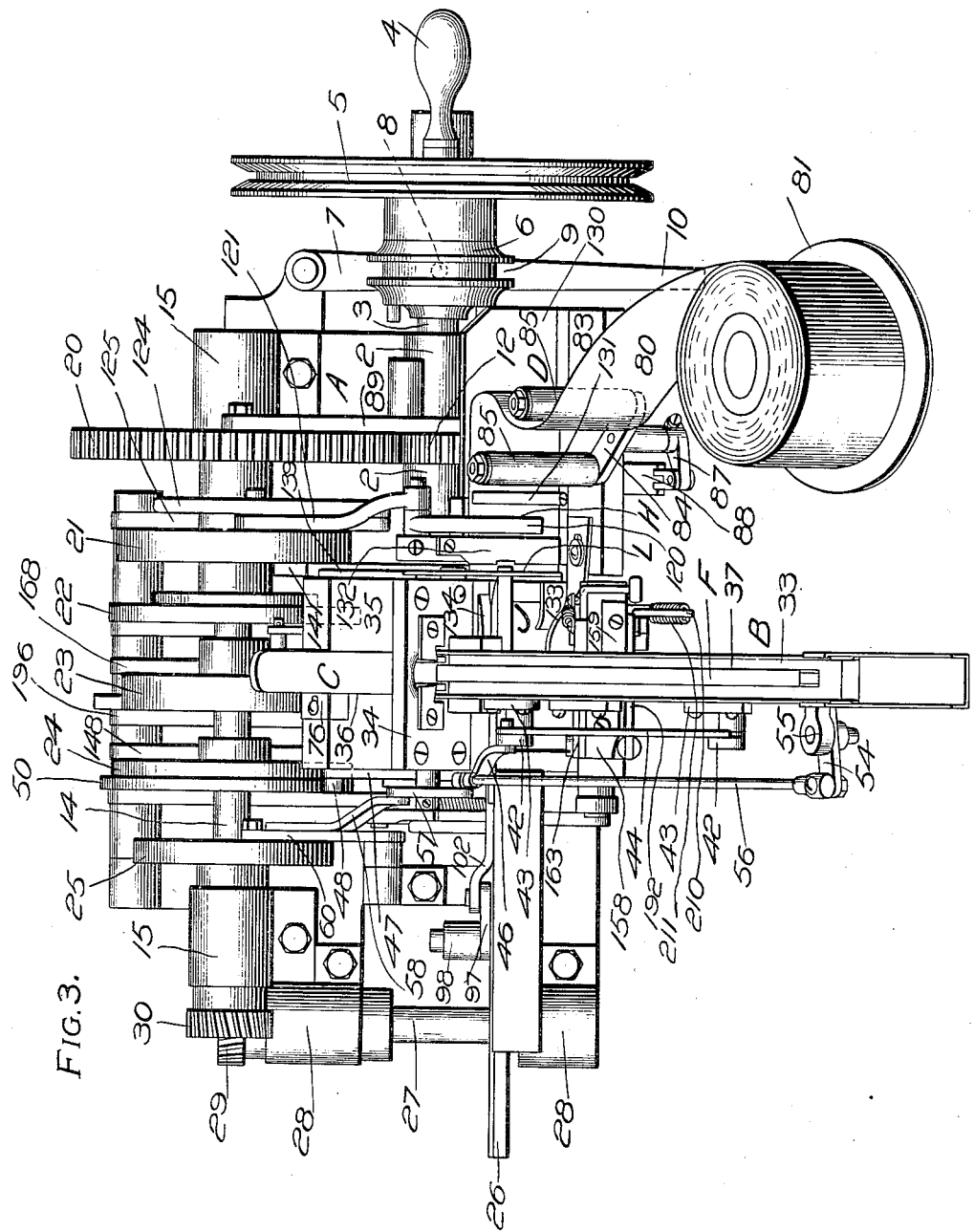

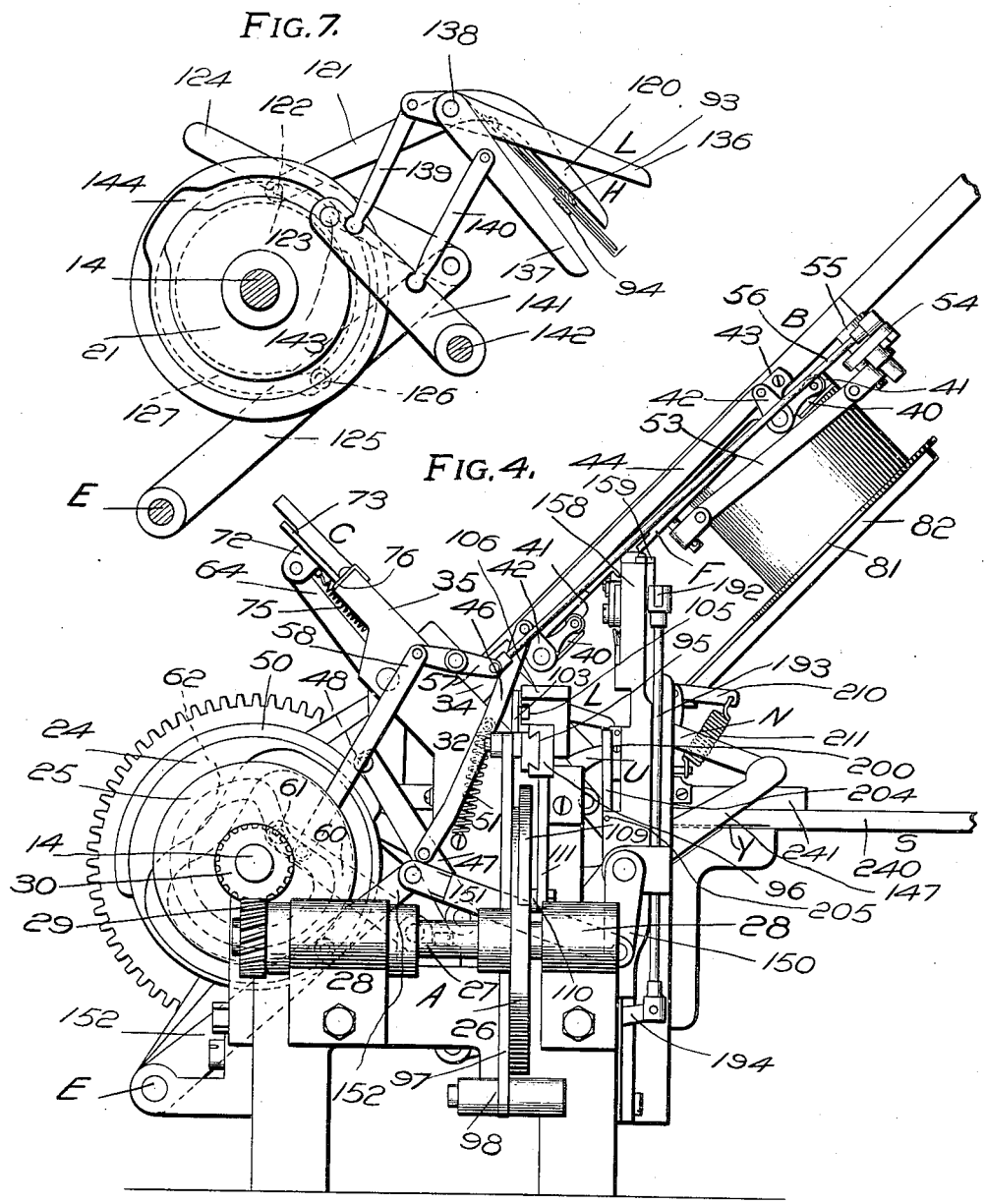

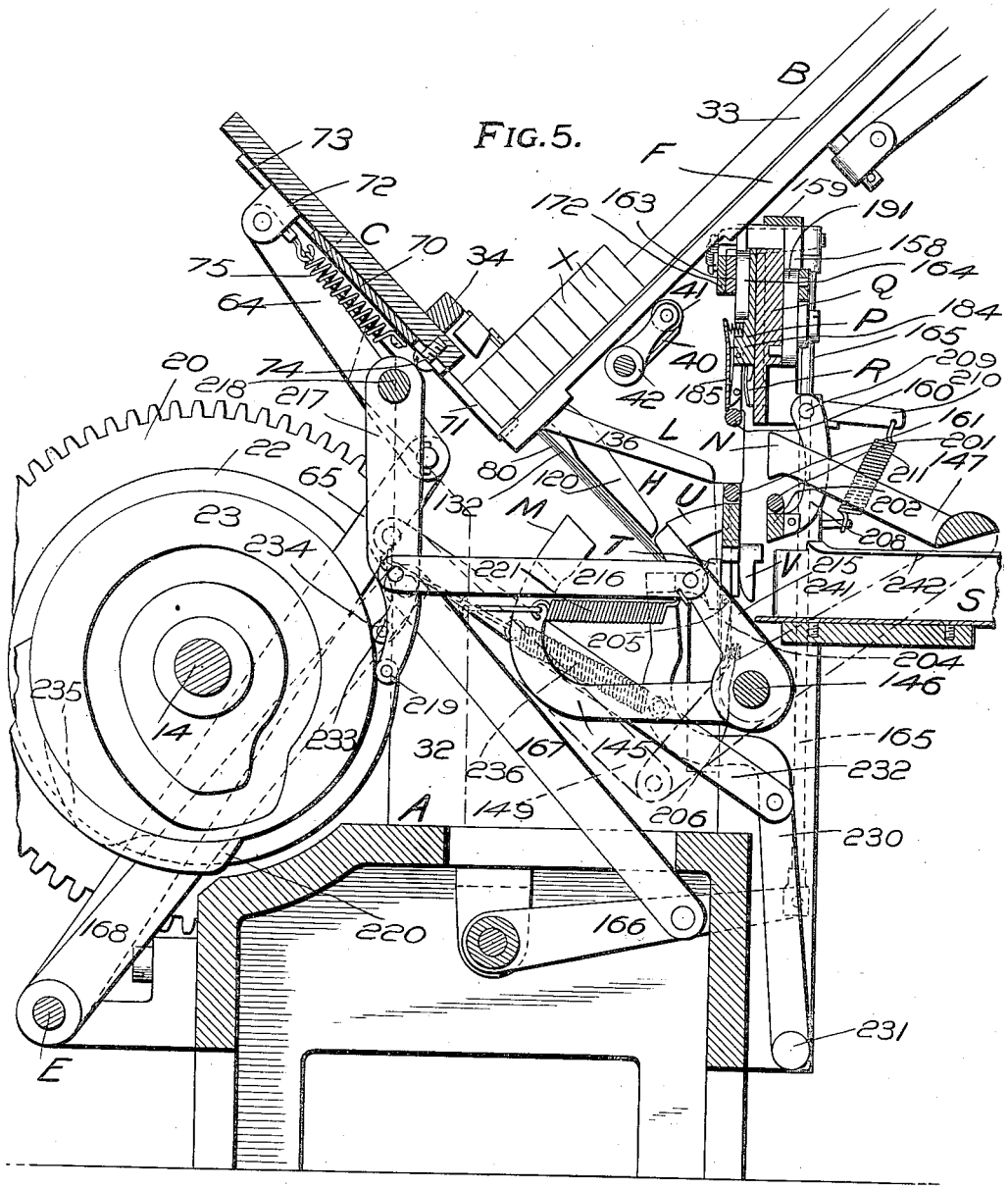

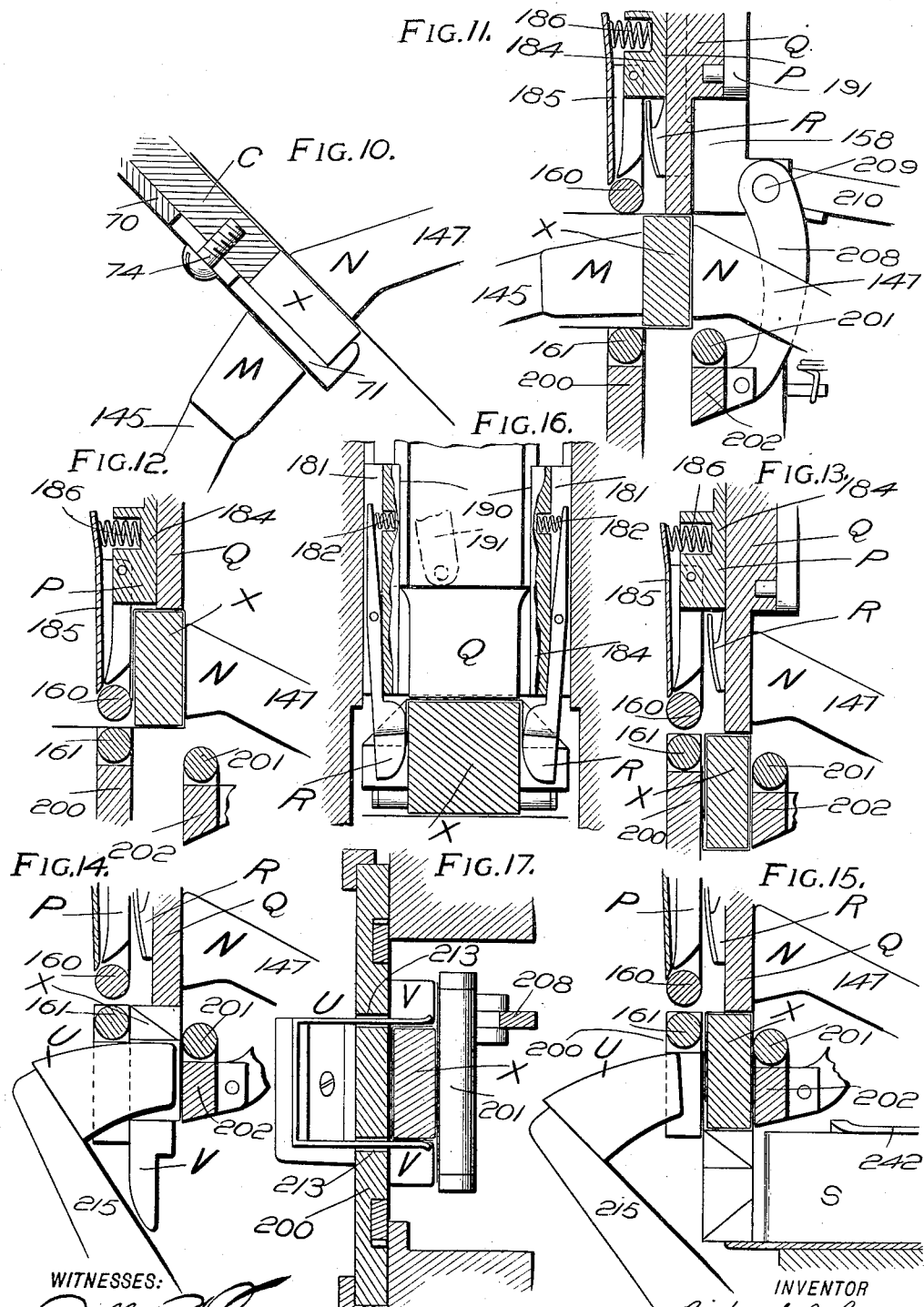

R. A. BERGER.
WRAPPING MACHINE.
APPLICATION FILED JUNE 26, 1905.
1,048,933.
Patented Dec. 31, 1912.
7 SHEETS—SHEET 7.
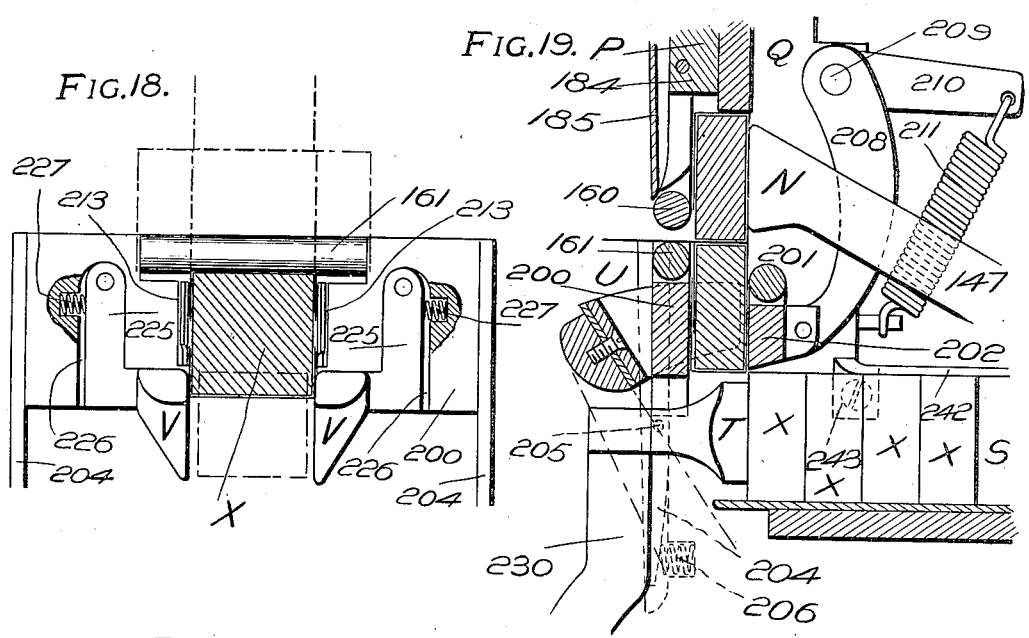
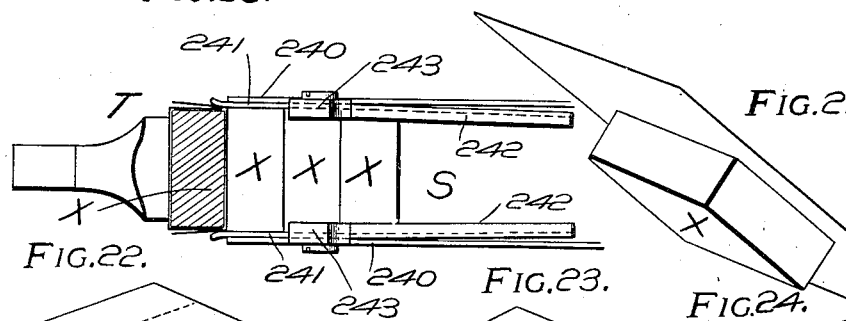
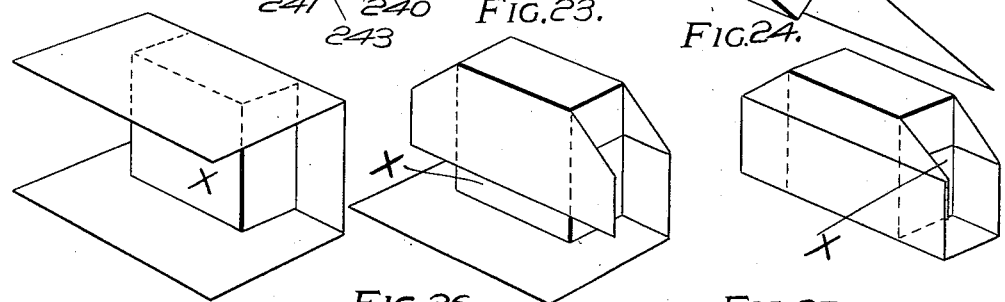
WITNESSES:
INVENTOR
Richard A. Berger
BY his ATTORNEY
Alfred Wilkinson

UNITED STATES PATENT OFFICE.

RICHARD A. BERGER, OF BROOKLYN, NEW YORK, ASSIGNOR, BY MESNE ASSIGNMENTS, TO CONSOLIDATED WRAPPING MACHINE COMPANY, OF SPRINGFIELD, MASSACHUSETTS, A CORPORATION OF MASSACHUSETTS.

WRAPPING-MACHINE.

1,048,933.    Specification of Letters Patent.    Patented Dec. 31, 1912.

Application filed June 26, 1905. Serial No. 267,113.

*To all whom it may concern:*

Be it known that I, RICHARD A. BERGER, citizen of the United States, residing at Brooklyn, in the county of Kings and State of New York, have invented certain new and useful Improvements in Wrapping-Machines; and I do hereby declare the following to be a full, clear, and exact description of the invention, such as will enable others skilled in the art to which it appertains to make and use the same.

My invention relates to wrapping machines for automatically wrapping articles, commonly of small size, in one or more wrappers.

The machine of the particular form here shown and described is called a "caramel" machine, because it is particularly adapted to wrap caramels of standard sizes in a single wrapper of wax paper. I do not, however, desire to limit the use of my present machine to caramels, because it may be modified in form, size, arrangement of parts, etc., and applied to a great variety of uses.

The principal improvement and modification described and claimed herein relates to the folding mechanism and the arrangement with reference thereto of the magazine, delivery mechanism, pusher and chute, also in certain attachments to the magazine by which the feeding downwardly of the caramels, or cakes, is insured. By this great speed is attained, which is particularly necessary in case of cheap articles, which are made, distributed and then sold at retail in large quantities; and the wrapper is well folded and creased, so that mucilage is not necessary practically to secure the wrapper on each cake. By the use of a single wrapper, without mucilage or a binder the cost is decreased.

My machine is small, compact, light and comparatively simple, considering the results obtained.

A desirable construction of machine, embodying my invention and particularly adapted for the purposes herein indicated, is shown in the drawings herewith, in which the reference letters and numerals of the specification indicate the corresponding parts in all the figures.

Figure 1 is a front elevation of my improved machine. Fig. 2 is a rear elevation. Fig. 3 is a top plan. Fig. 4 is a side elevation, taken from the left. Fig. 5 is an enlarged, vertical, longitudinal section parallel to Fig. 2 to illustrate the relation of the different parts of the machine, particularly the relation of the magazine and the feed mechanism to the folding mechanism and the chute, and the movement of the transferring fingers. Fig. 6 is a detail showing the construction of the gripper. Fig. 7 is a diagrammatic detail taken from the left showing the relation of the cutter and clamp. Fig. 8 is an enlarged detail top plan of the folding mechanism. Fig. 9 is a detail, taken from the rear, to illustrate the means for operating the folder slide. Figs. 10 and 11 are enlarged details illustrating the operation of the transferring fingers in taking the cake and wrapper and transferring them into the folding position. Figs. 12 to 15 are enlarged detail, vertical sections showing the different parts of the folding mechanism and illustrating the successive steps of operation thereof. Fig. 16 is a similar, detail, vertical section at a right angle to the preceding. Fig. 17 is a similar detail in cross section. Figs. 18 and 19 are similar, vertical sections, taken at right angles to each other showing the lower portion of the folding mechanism. Fig. 20 is an enlarged detail plan showing the relation of the pusher to the chute. Figs. 21 to 27 are enlarged perspective views showing the cake and the wrapper in the successive steps of the folding operation, and are adapted to be read with the preceding details.

In the drawings, A indicates the bed-plate, which is preferably cast in one solid piece, or otherwise suitably made, to provide a firm, solid base, supported on integral short legs as here shown, or on other suitable support. On this bed-plate are bolted the main uprights, side-pieces, brackets and journal bearings, on which the different parts of the mechanism are respectively supported and journaled. These parts make up the supporting frame, which may be varied in arrangement and construction. The bed-plate may desirably be recessed at the left, on the rear and centrally, to obtain compactness in arrangement and convenience in assembling and in manipulating the various parts.

I will first enumerate the more important cams, connections and operative means by which the various parts of the machine are operated at the proper times, to perform in turn the various operations incident to the feeding, wrapping and expelling in rapid succession of the articles to be wrapped, which I will call the "cake." The cake may consist of several pieces as gum, etc., or of one piece such as caramels, chocolate, soap, etc. The various operations consist successively in the movement by articulated mechanism of a feed bar in the bottom of the inclined magazine, whereby the cakes are loosened and there carried down on an incline to the feed slide, which is arranged on a reverse incline at a right angle, more or less, to the magazine, to deliver the cake forwardly and downwardly in position to be taken by the fingers; then drawing out the wrapper from the reel over the cake by the gripper; while the wrapper is being drawn out, clamping the strip and severing the wrapper therefrom; gripping the cake with a superposed wrapper between the fingers; shifting it into the folding mechanism, whereby the top and bottom edges of the wrapper are turned back against the edges of the cake; folding down the top flap and simultaneously crimping the top edge by the folder slide and top crimpers; then, by the expeller slide, moving the cake down between a pair of tension rollers, or tension cross bars provided with antifriction rollers, whereby the lower flap is folded up; moving forward the end folder by which the rear ends of both flaps are folded forward; pushing the cake downwardly, another step through the interposition of the following cake, between the bottom crimpers, whereby the bottom edge is crimped; and finally moving the cake forwardly into the chute by the pusher, whereby the front ends of the wrapper are folded back.

*Operating mechanism*, (Figs. 1-5, 7.)—In bearings 2 2 bolted on bed-plate A, is journaled the driving shaft 3, carrying the crank 4 for operation by hand, and the usual loose pulley 5 for the belt, when the machine is driven by power. The pulley is thrown into and out of connection with the shaft by means of usual clutch 6, connected to the shaft by usual feather and spline for this purpose, and shifted by clutch lever 7 provided with roller stud 8 engaging with clutch groove 9 on the clutch and having shifting handle 10. The clutch may be provided with pins fitting corresponding holes in pulley face, or provided with other means by which it is locked to the pulley when forced against it. The driving shaft carries, between the bearings 2 2, the pinion 12 meshing with main gear 20 on main shaft 14, journaled in suitable bearings 15 15 on the rear of the bed-plate. (Figs. 2, 3.)

Gear 20 is also a cam wheel, by which the slackener D is operated through suitable connections and a cam groove on one face of the cam wheel, the right face as here shown. The main shaft also carries the cutter-cam-wheel 21, through which is operated, respectively by left and right cam grooves, the cutter L, and the clamping mechanism H, for clamping and holding the wrapper strip while the wrapper is being severed therefrom by the cutter; the feed-cam-wheel 22 from which, by a cam groove on one face, is operated the feed-slide C; the folding-cam-wheel 23 operating the folder-slide P and the first or top crimpers R R by a right cam groove, the expeller-slide Q by left cam groove, the pusher T by an edge cam arranged at the right, and the edge folder U by an edge cam arranged at the left; the finger-cam-wheel 24 operating both fingers, the upper finger N by a right cam groove, the lower finger M by a left cam groove, and also operating by means of an edge cam the articulating mechanism for raising and lowering at proper times the feed bar F; 25 the feed-bar-cam-wheel provided with a cam groove from which is reciprocated parallel to its magazine said feed bar (Figs. 2, 3).

26 is the gripper-cam-wheel secured on countershaft 27 journaled in bearings 28 28 at right angles to the main shaft, and carrying a worm gear 29 meshing with corresponding gear 30 on the main shaft. From this gripper-cam wheel, by a cam groove on one face, is reciprocated the gripper J, and by its edge cam, the gripper is operated to open and close (Fig. 4).

*Magazine and delivery mechanism*, (Figs. 1-5.)—On the inclined upper face of the main uprights 32 is bolted the magazine B, composed of a channel 33 and of a base 34 secured to the inclined top pieces 35 on the main uprights 32 and bridging a space 36 between said top pieces. In a longitudinal slot 37 in the bottom of said channel 33 is fitted the feed-bar F connected to a mechanism, by which it is slightly raised above the bottom of the channel, and then moved downwardly to clear and loosen the cakes from the channel, and then to carry them downwardly to the feed-slide C. On its under surface this feed-bar is provided with channel irons 40 to receive the antifriction rollers 41 on the lower arms of feed-bar cranks 42, suitably journaled in brackets 43, and having their upper arms connected by articulating link 44. The lower of said upper crank arms is connected by bent link 46 to feed-bar rocking lever 47, carrying roller stud 48 held against edge cam 50 on the finger-cam-wheel 24 by a suitable spring 51, connected to said bent lever, or otherwise arranged. When the feed-bar has been raised by said mechanism to clear the cakes from adhesion to the channel, it is moved downwardly to deliver the lowest cake to the feed-slide, then retracted to receive it, by means of link 53 pivotally connected to some suitable point on the lower surface of the feed-bar, and also pivotally connected to the upper rocker-arm 54, suitably journaled on bracket 55 on the upper end of the magazine. Said rocker-arm is connected at its other end by connecting-rod 56, to lower rocker-arm 57, suitably journaled on the side of the base 34, and said lower rocker-arm has its opposite end connected by link 58 to feed-bar shifting lever 60, carrying roller stud 61 engaging in cam groove 62 on feed-bar cam wheel 25.

*Feed-slide*, (Figs. 4, 5, 10.)—The cakes X, placed in the magazine by the operator, or automatically cut and delivered thereto by other means, are received therefrom by the feed-slide C connected and operated by its link 64 to lever 65, journaled on cam-wheel-shaft E arranged at the rear of the machine, and provided with suitable roller stud engaging with suitable cam groove in feed cam-wheel 22, to transfer the cakes in turn over the lower finger M. This feed-slide C reciprocates also in a groove in the magazine base, and carries on its lower surface a hook-slide 70 having forwardly extending hooks 71, (between which the lower end of the feed-bar passes) to receive and carry the cake, and to retain it against the feed-slide front edge. This hook-slide is secured and maintained in position on the feed-slide by guide 72, projecting down from the feed-slide and fitting between rear forks 73 on the hook slide, and by stud 74, fitting a slot in said hook-slide, so that it is capable of a slight movement longitudinally on its feed-slide. Spring 75 is provided to draw the hook-slide back toward its feed-slide, whereby the cake is gripped between the tips of the hooks 71 and the front edge of the feed-slide, with a positive but gentle pressure. When moving back, the hook-slide is stopped by engagement of one of its rear forks 73 with stop 76 on one of the inclined top pieces, opening the hook-slide on the feed-slide, easily to receive the cake, which is immediately gripped, as the feed-slide starts forward, and carried forward to be placed immediately over the lower finger M, then in initial, lowest position. The fingers N and M may have enlarged surfaces to engage with the cake if desired, but the face of the lower finger must be small enough to pass between the hooks and take the cake therefrom.

*Reel and slackener*, (Figs. 1, 2, 3.)—The strips 80 of wax paper, from which the wrappers are cut, may be supported on the reel 81 journaled on the end of the reel bracket 82, which may be bolted directly to the bed-plate and braced by the strip-plate bracket 83. From this reel the strip is drawn over the slackener mechanism D, provided to form a loose, or slack, portion in the strip, to be drawn out by the gripper without the strain or danger of tearing the paper that would exist if the gripper drew directly from the reel. This slackener mechanism D consists of the rocking-bar 84 suitably journaled and carrying the anti-friction rollers 85 preferably of wood. This rocking-bar is journaled on its rocker pin 86 in a suitable bearing, and connected by crank 87 and link 88 to the slackener lever 89 suitably journaled and provided with a roller stud to engage an operating cam groove, of the required form, on the right side of the slackener-cam-wheel 20, the character of which will be readily understood without illustration.

*Gripper*, (Figs. 1, 2, 3, 4, 6.)—The gripper J is composed of an upper jaw 93 and pivoted thereto a lower jaw 94. The upper jaw has its rear portion fitted to dovetail grooves 95 on the gripper frame 96, on which the gripper is reciprocated to draw the wrappers over the cakes sustained on the hooks on the feed-slide. The gripper is reciprocated by means of the gripper lever 97 pivoted by its lower end at some suitable point 98 on the base and provided with roller stud 100 engaging with cam groove 101 on gripper-cam-wheel 26. Link 102 connects the gripper to the gripper lever (Fig. 2).

The gripper is positively closed to grip the end of the strip by the engagement of the integral extension 103 on the lower jaw, carrying roller stud 104, with groove 105 on the rear face of rocking-frame 106, pivoted at 108 on the gripping frame (Fig. 6). This rocking-frame is positively rocked down to close the jaws by the engagement of edge cam 109 on cam wheel 26 with a roller stud 110 on the lower arm of bell-crank lever 111, pivoted in the gripper frame, and having its upper arm arranged in a groove in the gripper frame and positively connected to the rocking-frame 106 by link 112, which passes through a slot in the gripper frame. When cam 109 is out of engagement with the bell-crank lever 111, spring 114 operates to rock up the rocking-frame and open the jaws, which must take place after the wrapper has been drawn out and deposited on the cake. The jaws are then maintained open until they have been returned adjacent to the box to grip a new wrapper, or, strictly speaking, are opened wider as they return, the more easily to receive the edge of the wrapper, by means of the upward inclination or rocking-frame and its groove. When the gripper has gripped the strip, it is operated by the form of its cam groove 101, first to draw out the strip a sufficient length, then momentarily to pause while the strip is clamped and the wrapper severed by the cutter, and then to move back farther to carry the wrapper over the cake.

*Wrapper strip clamp,* (Figs. 1, 2, 3, 5, 7).—After the wrapper strip has been drawn out by the gripper, the strip is positively clamped to facilitate the operation of the cutter and the slackener by means of a clamping mechanism H consisting of a clamping jaw 120 pivotally journaled on strip-plate bracket 83 and having a rear extension 121 provided with pin 122 to engage in notch 123 of link 124 pivotally connected to clamping lever 125 provided with roller stud 126 engaging in cam groove 127 of cutter-cam-wheel 21. (Shown in detail Fig. 7).

To insure proper arrangement of the strip 80, it is delivered onto a strip-plate 130, provided with finger 131 and guide-plate 132, both preferably resilient, by and under which the strip is retained on the strip plate and its front edge is maintained positively in the path of the gripper to insure its being gripped.

133 is a guide-plate adjustably arranged on the strip-plate-bracket whereby the lower edge of the strip is carried clear of the other parts, particularly of the folding mechanism, and 134 is a guide lug slightly to raise the upper edge of the strip and carry it over the cake on the lower finger. (Fig. 3).

*Cutter,* (Figs. 3, 7).—A cutter mechanism L is arranged immediately adjacent to the front edge of the strip-plate 130 to sever in succession each wrapper from the strip. This cutter mechanism consists of upper and lower blades 136 and 137, pivoted at the same point 138 on one of the main uprights, and reversely connected by links 139 and 140 to a cutter-lever 141 pivoted at 142 and provided at its rear end with roller stud 143 engaging in left cam groove 144 on cutter-cam-wheel 21, so that the two blades of the cutter operate in opposition to each other like scissors.

*Fingers or transferring mechanism,* (Figs. 4, 5, 10, 11).—The fingers are arranged and operated substantially as I have described in the description of another machine, on which I have heretofore filed an application, issued under date of August 11, 1908 as Letters Patent No. 895,945, to swing through a short arc of 45°, more or less, whereby speed of operation is promoted. While the lower finger M carried on shank 145, (curved freely to enter folding mechanism) fixed on finger-shaft 146, is in initial position below the hook-slide, the wrapper is drawn out over the cake and the upper finger N, on its bell-crank shank 147, loose on said shaft 146, is swung down by the operation of upper finger lever 148 journaled on cam-lever shaft E (Fig. 2), carrying a roller stud engaging with right cam groove on finger-cam-wheel 24, 149 being the connecting-link to lower extension on the lower arm of bell-crank shank 147, whereby the cake and wrapper are first gripped between the upper finger and the hooks. The lower finger is then swung upwardly to engage with the cake by means of crank 150 on the outside end of the finger-shaft, connected by link 151 to lower finger lever 152, also journaled on the cam lever shaft E and carrying a roller stud engaging with a cam groove on the left side of the cam 24. The fingers are then timed, by the form of their cam grooves, to be swung up and forwardly through the short arc to carry the cake and wrapper into the folding mechanism, during which movement the upper and lower edges of the wrapper are folded back against the edges of the cake (Fig. 11).

The lower finger link 152 may be made integral but is preferably made in two portions, held together by the action of a suitable spring, whereby a slight elongation of the link is permitted, and a certain amount of variation in the position of the lower finger to adjust itself to varying thicknesses of the cake, as described in a previous application above referred to.

*Folding mechanism.* (See Fig. 5 and other main views, also details Figs. 8, 9, 11–20.)—The various elements of the folding mechanism by which the four edges of the wrapper are folded and crimped around the cake are principally supported on the parallel, vertical side-pieces 158, which may desirably be bolted on the front of the machine. These vertical supports are vertically grooved on the inner faces of their upper ends to receive the folder-slide P, and may be connected on top by a brace 159. As the cake with its superposed wrapper is swung by the fingers into the folding mechanism, it passes between the slide-roller 160 on the folder-slide and a lower, rear, tension roller 161 on the rear tension frame, whereby the top and bottom flaps are folded against the edges of the cakes (Fig. 11). The folder-slide P, carrying the top crimpers R R, is next depressed in said grooves to fold down the upper flap against the rear face of the cake by said folder-slide, and simultaneously to crimp the top edges by means of said crimpers. (Figs. 12, 16). These parts are operated at the proper time by their operative connections, consisting of the angular lever 163 connected to the folder-slide by link 164 and at its opposite outer end to the right vertical connecting rod 165, which is connected to the outer end of folder-slide lower lever 166, and the latter by link 167 to folder-slide main lever 168, carrying a roller stud engaging with a suitable right cam groove in folding cam wheel 23 (Figs. 1, 5). The folder-slide is preferably connected indirectly to said angular lever 163 through the medium of spring lever 172, pivotally supported at 173 on the same bearing as said angular lever and connected to the angular lever by short spring 174. The link pin 171, connecting said link 164 to the spring lever, passes through a short slot 175 in the angular lever. By this spring connection between the parts, they adjust themselves to slight variations in the cakes, and rigidity in operation is avoided, which would be undesirable in folding articles more or less soft and easily pressed out of shape, like caramels, etc. Said spring lever and said angular lever are also connected by pin 176, which is arranged in slot 177 in the spring lever, to limit the movements of the levers, and side stops 178 are also provided on the spring lever, which coöperate to limit the movement of the parts one on the other (Figs. 8, 9).

In vertical edge grooves 181 on the folder-slide are pivoted by their shanks the top crimpers R R having enlarged heads arranged immediately beneath the body 184 of the folder-slide and spaced to receive between them the upper end of the cake, whereby the upper edges of the wrapper are crimped down as shown in Fig. 23. These heads preferably are formed with beveled lower ends or noses, the more easily to receive and engage with the cakes, and to crimp the wrapper without tearing. Springs 182 are suitably arranged to maintain the heads in against the edges of the cake or caramel with a slightly positive but sufficient pressure, (Figs. 8, 11, 16).

The folder-slide is preferably composed of a main portion or body 184 and of a sheet metal jacket 185, pivotally fitted to the lower rear portion of the body and carrying the tension slide roller 160 heretofore mentioned. Spring 186, suitably arranged between the jacket and the body, tends to hold inwardly against the back of the cake the roller with a sufficient slight tension (Fig. 11).

The expeller-slide Q is fitted to dovetail grooves 190 on the forward face of the folder-slide and is operated through the medium of link 191, connected by the upper expeller-lever 192, to left connecting-rod 193, connected by lower expeller-lever 194 and link 195 (Fig. 2) to main expeller-lever 196, carrying a suitable roller stud engaging in a suitable cam groove on left face of folding-cam-wheel 23 (Figs. 1, 8, 11, 13, 16).

After the folder-slide and upper crimpers have operated, the expeller-slide is moved downwardly by means of said operative connections to force the cake between the lower rear roller 161 on rear, tension frame 200 and the front roller 201 on front, tension frame 202 to fold up against the cake the lower rear flap (Figs. 12, 13, 24). Both of these frames are hung on pivotal supports and are held by tension springs in yielding engagement with the cake to adapt themselves as aforesaid to cakes of slightly varying thicknesses, and to avoid crushing or pressing out of shape more or less soft cakes. The rear frame 200 is carried on arms 204, pivoted at 205, and held against the cake by spring 206 suitably arranged. The front tension frame 202 is carried on arm 208 on pivot 209, suitably journaled and carrying outer crank arm 210, to which is connected spring 211 to hold the frame and its roller in position with sufficient tension. These tension frames hold the cake in position for the next operation.

The end-folder U, having two parallel arms, preferably with flaring ends and spaced to span the cake, is next timed to swing forward through slots 213 in rear frame 200 to fold in against the ends of the cake the ends of the rear folds of the wrapper. This end-folder U is carried on the end folder arm 215 loose on the finger-shaft 146, and is operated by carrying anti-friction roller 219, to engage with left edge cam 220 on folding-cam-wheel 23. Spring 221 is suitably connected to hold said edge folder lever against its cam (Figs. 5, 14, 15, 17, 25).

After the ends of the rear folds have thus been folded forward against the ends of the cake, the first cake is forced down farther by means of the expeller, through the medium of the next cake, between the bottom crimpers V V, carried on shanks 225, hung on the sides of the rear, tension frame 200, and arranged in cut-outs 226 in said frame, and having their enlarged heads forwardly extending from said frame to embrace between them the cake to make the bottom crimps. The heads of these bottom crimpers are slightly beveled at their upper edges easily to receive the cake between them, to form the lower crimp, without crushing the cake or tearing the wrapper. These bottom crimper heads are also held inwardly against the edges of the cake with positive but yielding pressure by suitable springs 227, suitably arranged (Figs. 18, 19, 26).

The various operations of folding the wrapper about the cake have now been effected, except that the front end folds remain unfolded as shown in Fig. 26. These are now folded back against the ends of the cake, by engagement with the sides of the horizontally arranged chute S as the cake is pushed into the chute by the pusher T, carried on the curved pusher shank 230, pivoted at 231 near the lower end of one of the side supports and connected by pusher link 232 to the operative pusher lever 233, hung at 218, and carrying at its lower end the antifriction roller 234, engaging with the right edge cam 235 on folding-cam wheel 23. This roller is held against the cam by suitable spring 236 connected to the link (Figs. 5, 19).

The receiving chute may be horizontally arranged, or incliner up or down for convenience in delivering the cakes, and extends outwardly from the front of the machine for convenience in removal of the wrapped cake. To the inner ends of its side flanges 240, preferably separated from the base for a short distance to obtain a slight resiliency, as shown in Fig. 4 at Y, are secured by their forward ends the side wings 241 having slightly flaring, inner, receiving ends, top flanges 242, terminating in blocks 243 having slightly beveled inner ends, whereby the cakes are easily received in the end of the chute between these side wings, and, while being forced between them by the following cakes, are held down in position beneath the top flanges and are subject to a slight resilient pressure by which the wrappers are further pressed and creased in place onto the cakes.

The tension springs applied to the top and bottom crimpers, to front and rear tension frames, to the operating levers of the folder-slide and to other parts are very desirable to permit the various parts of the machine to adapt themselves to small variations in the size of the cakes, and to engage with the cakes with a sufficient but yielding pressure, whereby the cakes are not crushed, nor mutilated, nor the wrappers torn.

The magazine and the feed-slide are arranged substantially at a right angle to each other, and are tilted, or arranged at an angle to the horizontal, whereby the cakes are conveniently deposited in the inclined magazine and fed down therein by the assistance of the feed-bar which slightly elevates the cakes in the magazine to prevent sticking thereto. The cakes and the superposed wrappers are then received from the feed-slide and swung through the shortest possible arc into the folding mechanism, where the cake is maintained on edge during the process of folding the wrapper.

From its comparative simplicity and compactness, from the transferring of the cakes and wrappers through short distances, and from the fact that many of the operations are simultaneous, this machine may be operated at a high rate of speed.

While this machine is particularly adapted for folding caramels and similar articles in a single wrapper, yet by slight modifications in form, size and arrangement of parts, it may be adapted to the folding of many sorts of the smaller articles of merchandise, and such articles may be wrapped in one or more thicknesses of wrapper of the same or different materials, which are simultaneously drawn out in strips from the various rolls or reels. Attention, however, is called to the fact that it is particularly devised for use with caramels and similar articles, in which only one wrapper, for instance, of oil paper, is necessary, but in which several operations are required to fold the wrapper around the cake where it is sufficiently held in place by the manner in which the various folds are made and the adhering of the wrapper.

Having thus described my invention, what I claim as new and desire to secure by Letters Patent, is:—

1. In the folding mechanism of a wrapping machine, the combination with means to move the cake in a horizontal direction, and means operative simultaneously therewith to fold the upper and lower flaps of the wrapper against the upper and lower edges of the cake, of means to change the direction of movement of the cake and to move it in a vertical direction, means operating while the cake is so moving to fold down the upper flap and means simultaneously to crimp down the top edges, means to fold up the lower flap, means to fold forward the rear end folds and means to crimp up the bottom edges, and finally means to push the cake from the folding mechanism whereby the front end folds are folded.

2. In the folding mechanism of a wrapping machine, the combination of means to fold the upper and lower flaps of the wrapper against the upper and lower edges of the cake, and means operating while said folds are being made to move the cake substantially horizontally into the folding mechanism, means to fold down the top flap and means simultaneously to crimp down the top edges, while the cake is momentarily stationary, means to fold up the bottom flap, means to move the cake down substantially vertically while said bottom flap is being folded, means to fold forward the rear end folds while the cake is momentarily stationary, means to crimp up the bottom edges, means to move the cake down substantially vertically, while the edges are being so crimped, and means to push the cake from the folding mechanism and simultaneously to fold the front end folds.

3. In a wrapping machine, a suitable supporting frame, means for delivering the cake and superposed wrapper into a folding mechanism, whereby the upper and lower flaps are folded against the corresponding edges of the cake, and said folding mechanism on the frame, having a folder-slide on the frame provided with grooves, means to reciprocate the folder-slide, top crimpers supported on said slide and having heads extending below said slide, an expeller slide fitted to the grooves in the folder-slide, means to reciprocate the expeller-slide in the folder-slide, front and rear tension frames on the frame, an end-folder, means to operate the end-folder, bottom crimpers on the frame, a receiving chute, a pusher to deliver the cake from the folding mechanism into the chute, and means to operate the pusher.

4. In a wrapping machine, a suitable supporting frame, means supported on the frame for delivering the cake and wrapper into a folding mechanism, whereby the upper and lower flaps are folded against the corresponding edges of the cake, and said folding mechanism having parallel vertical side-pieces supported on the frame and having grooves in the upper ends of their inner faces, a folder-slide fitted to said grooves, means to reciprocate the folder-slide in said grooves, top crimpers on said slide, an expeller-slide fitted to grooves in the folder-slide, means to reciprocate the expeller-slide, front and rear tension frames, an end-folder, means to operate the end-folder, bottom crimpers suitably supported, a pusher to deliver the cake from the folding mechanism, and means to operate the pusher.

5. In a wrapping machine, a suitable bed-plate, a folding mechanism, means on the bed-plate for delivering the cakes and the superposed wrappers in turn into a folding mechanism, whereby the upper and lower flaps are turned against the corresponding edges of the cake, and said folding mechanism having substantially vertical, parallel side-pieces on the base plate provided with grooves in their upper ends a folder-slide fitted to said grooves and provided with folder grooves, top crimpers on said slide having heads extending under the edges of said slide, cam operative means to reciprocate said slide and crimpers, an expeller slide fitted to said folder grooves cam operated means to reciprocate the expeller slide, front and rear tension frames suitably spaced and arranged on the side pieces below said slides said rear tension frame being provided with slots, an end-folder having parallel arms extending through said slots, cam operated means to swing the end-folder, bottom crimpers having heads extending below the path of said arms, a chute extending outwardly from the lower portion of the folding mechanism adjacent to the bottom crimpers, a pusher, and means to reciprocate the pusher between the bottom crimpers to the mouth of the chute.

6. In the folding mechanism of a wrapping machine, a folder-slide to engage with one face of the cake, a pair of crimpers on the slide to engage with the edges of the cake, and means to depress the slide and crimpers simultaneously to fold one flap and to crimp the corresponding edges of the wrapper, and to return the slide to initial position.

7. In the folding mechanism of a wrapping machine, a folder-slide, top crimpers supported thereon, means to support the folder-slide and means to move the folder-slide and crimpers together, simultaneously to fold down the upper flap and to crimp the top edges of the wrapper.

8. In the folding mechanism of a wrapping machine, parallel side-pieces having grooves on their inner faces, a folder-slide fitted to said grooves, a tension roller supported on the slide and arranged below the rear portion of the slide lower edge, top crimpers having elongated shanks arranged in grooves in the side edges of the slide and enlarged heads extending below the front portion of the slide lower edge, springs engaging with said shanks to maintain the heads in engagement under tension with the sides of the cake, and means to depress the slide and crimpers simultaneously to fold down the upper flap and the top edges of the wrapper, respectively against one face and the edges of the cake.

9. In the folding mechanism of a wrapping machine, the combination of a base-plate, vertical side pieces thereon, having grooves on their inner surfaces a vertically reciprocating folder-slide fitted to said grooves and arranged between the upper ends of said side-pieces, an angular lever and a spring lever journaled at the same point on one of said side-pieces, the angular lever being arranged adjacent to the folder-slide and between it and the spring lever said angular lever being provided with a short slot, a link connected to the folder-slide, a link pin passing through said short slot in the angular lever and connecting said slide to said spring lever, a tension spring connecting said levers, stops limiting the relative movements of said levers, and connections between the free end of the angular lever and an operative cam, whereby said slide is operated.

10. In a folding mechanism of a wrapping machine, parallel, vertical side-pieces having grooves on their inner edges, a folder-slide fitted to said grooves said folder slide having grooves on its front face, a tension roller arranged on the folder-slide and extending below the folder-slide, top crimpers arranged on the folder-slide below its lower edge in front of said roller, an expeller-slide arranged in said grooves in the front face of the folder-slide, front and rear tension frames arranged parallel on the side-pieces below the folder-slide, means to depress the folder-slide and crimpers to fold the upper flap and to crimp the top edges of the wrapper, and means thereafter to depress the expeller-slide to force the cake between the tension frames and to fold the lower flap of the wrapper.

11. In the folding mechanism of a wrapping machine, the combination with a suitable bed-plate, of vertical, parallel side-pieces supported thereon and having grooves in their upper ends, a folder-slide fitted in said grooves and having vertical edge grooves, sockets in said edges and dove-tail grooves in its front face, a metal jacket pivotally supported on said slide, an antifriction roller on the lower end of said jacket arranged under the lower end of the rear portion of said slide, a spiral tension spring arranged in a depression in said slide and engaging with an extension on the upper end of said jacket to hold the roller in position to engage with and fold the upper flaps of the wrapper on the cake, top crimpers pivotally supported by their upwardly extending, elongated shanks in the vertical edge grooves in the folder slide and having enlarged heads arranged below the side edges of the front portion of said slide, said heads having beveled lower ends, spiral springs arranged in said sockets in the edges of said slide and engaging with said shanks above their pivotal support to hold said heads inwardly against the edges of the cakes, cam operated means and connections to depress simultaneously said slide and said top crimpers to fold down the rear flap and to crimp the top edges of the wrapper, an expeller-slide arranged in said dovetail grooves on the front face of said folder-slide and cam operated means to depress said expeller-slide in said grooves to engage with the upper edges of the cakes and move them downwardly.

12. In the folding mechanism of a wrapping machine, the combination with a suitable bed-plate, of side-pieces supported thereon, a folder-slide having dovetail grooves on its front face, an antifriction roller on the lower end of said slide, top crimpers supported on said slide and having enlarged heads arranged below the side edges of said slide, cam operated means and connections to depress simultaneously said slide and said top crimpers to fold down the rear flap and to crimp the top edges of the wrapper, an expeller-slide arranged in said dovetail grooves on the front face of said folder-slide, cam operated means to depress said expeller-slide in said grooves to engage with the upper edges of the cakes and move them downwardly, a rear tension frame pivotally supported on the rear face of the side-pieces, an antifriction roller on the upper edge of said frame, a spiral spring arranged in a depression in the rear face of one side-piece to engage with the shank of said frame below its pivots to maintain said roller against the rear face of the cake, said folder-slide roller and said frame roller being arranged parallel and spaced to admit between them the cake and to fold back the flaps of the wrapper against the edges of the cake, a front tension frame, an anti-friction roller on the upper edge of said frame, said frame rollers being arranged parallel and spaced to receive between them the cakes as they are moved down by the expeller slide to fold up the rear flap on the cake, an arm carrying said front tension frame on its lower end, a pivot journaled in one side-piece, having said arm secured to one end, a crank arm on the opposite end of said pivot, and a spring connected to said crank arm to hold said front tension roller in against the cake.

13. In the folding mechanism of a wrapping machine, an end folder, suitable side-pieces, front and rear tension frames thereon to hold in position the cake while the end-folder is operating, said rear tension frame being provided with vertical, parallel slots, said end-folder being composed of a shank suitably journaled and flat, parallel arms on the upper end of the shank, said arms being spaced to receive the cake between them and to pass through said slots, and means to swing the end-folder forwardly to fold the rear ends of the wrapper against the ends of the cake by means of the flat arms.

14. In the folding mechanism of a wrapping machine, parallel, vertical side-pieces, an expeller-slide supported thereon, front and rear tension frames supported on the side-pieces below the expeller-slide and spaced to receive the cake between them, parallel antifriction rollers on the upper edges of the frames, bottom crimpers on the rear frame extending forwardly on each side below the expeller-slide and spaced to receive the cake between them, and means to depress the expeller-slide to force a second cake between said rollers to fold up the lower flap of the wrapper and simultaneously to force a first cake, by means of the second cake, between the crimpers to crimp the bottom edges of the wrapper.

15. In the folding mechanism of a wrapping machine, suitable supporting side-pieces, front and rear tension frames supported thereon spaced to receive between them the cake, bottom crimpers having bent shanks pivotally supported in cut outs in the front face of the rear frame, and heads on the lower ends of the shanks arranged between the frame on each side, said heads being spaced to receive between them the cakes, springs engaging with the shanks to hold the heads in yielding engagement with the edges of the cakes, and means to move the cakes between the tension frames and the crimpers, whereby the rear flap of the wrapper is folded up against the cake and the bottom edges are crimped up against the cake.

16. In a wrapping machine, the combination with a supporting bed-plate, of parallel, vertical uprights thereon, parallel, vertical side-pieces on the front of the machine, a folding mechanism supported on the side-pieces, a magazine on the main uprights being downwardly and rearwardly inclined, fingers suitably journaled, a feed-slide operating in a downwardly and forwardly inclined path, substantially at a right angle to the magazine, and movable below the lower end of the latter, means to operate the feed-slide to receive the cakes in succession from the magazine and deliver them between the fingers, means to deliver a wrapper onto each cake, means to swing the fingers to engage with the cakes and to deliver them on edge with their wrappers, to said folding mechanism, where the wrappers are folded on the cakes are effected while the cakes are moved downwardly on edge.

17. In a wrapping machine, a folding mechanism, a chute extending outwardly from the front of the machine, at the bottom of the folding mechanism, said chute having parallel side flanges spaced freely to receive between them the wrapped cakes, side wings secured within the said flanges near the side flange rear ends, said wings having rearwardly extending flaring ends, elongated resilient front portions and top flanges terminating rearwardly with blocks having beveled lower edges, and a pusher to push the wrapped cakes into the chute between the wings, whereby the front end flaps are folded against the ends of the cake and the wrappers pressed on the cake.

18. In a wrapping machine, an elongated magazine having side flanges and a longitudinal slot in its bottom, a feed-bar fitted to said slot, channel irons on the lower surface of the feed-bar, cranks journaled on the magazine and having their corresponding arms engaging with the channels, a connection between the opposite arms of the cranks, means to rock the cranks slightly to elevate the feed-bar above the bottom of the magazine, and cam operated means to shift the feed-bar, when in elevated position, downwardly and rearwardly parallel to the magazine.

19. In the folding mechanism of a wrapping machine, suitable supporting side-pieces, a rear tension frame arranged on said side-pieces and provided with cut-outs, bottom crimpers having shanks pivotally supported on said rear tension frame in said cut-outs and having enlarged heads depending from said shanks and forwardly extending from said frame to engage with the edges of the cake and crimp the bottom edges of the wrapper thereon, springs arranged to engage with said shanks and to force said crimper heads into crimping engagement with the side edges of the cake, and means to force the cake between the crimpers.

20. In the folding mechanism of a wrapping machine, a suitable frame for the parts, front and rear tension frames thereon, held in position by springs, to receive between them and hold in position the cakes while an end folder is operating, one of said frames having slots, means to force the cake between said frames, the end folder having arms spaced to receive the cake between them, means to operate the end folder and move its arms through said slots, to fold the ends of the wrappers, shanks at the lower ends of the frames, a pair of bottom crimpers inwardly extending from the lower ends of said shanks and means to force the cake from the frames between the crimpers to crimp the bottom edges of the wrappers.

21. In a wrapping machine, the combination with the frame and the folding mechanism thereon, of a folder slide, a tension frame suitably spaced from said slide to admit the cake means to deliver the cakes between said slide and frame to fold the flaps of the wrapper against the edges of the cake, means to operate the folder slide to fold over one flap and to crimp down the adjacent edge folds, an opposed tension frame spaced from said first frame to receive the cake between them, means to advance the cake to be sustained between the frame and simultaneously to fold down the opposite flap, means to fold in the end folds, bottom crimpers, to complete the wrapping of the cake with protruding end folds upon the cakes being advanced by the interposition of a succeeding cake, a pusher, means to operate the pusher to push the cakes from the folding mechanism and means simultaneously therewith to fold inwardly against the sides of the cake said end folds.

In testimony whereof I affix my signature in presence of two witnesses.

RICHARD A. BERGER.

Witnesses:
J. H. KEASIN,
ALLAN W. FOOSE.